Oct. 29, 1968  D. SIMKINS  3,407,758
EXPENDABLE PALLETS
Filed May 20, 1966  2 Sheets-Sheet 1

INVENTOR
DANIEL SIMKINS

BY Mason, Porter, Diller & Brown
ATTORNEYS

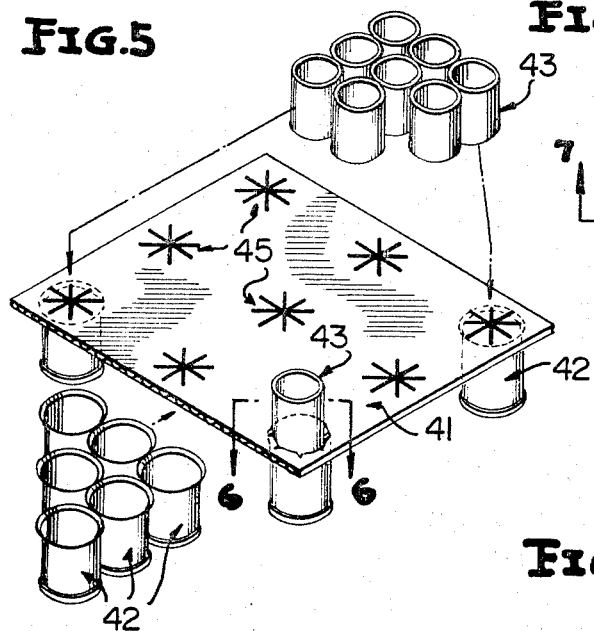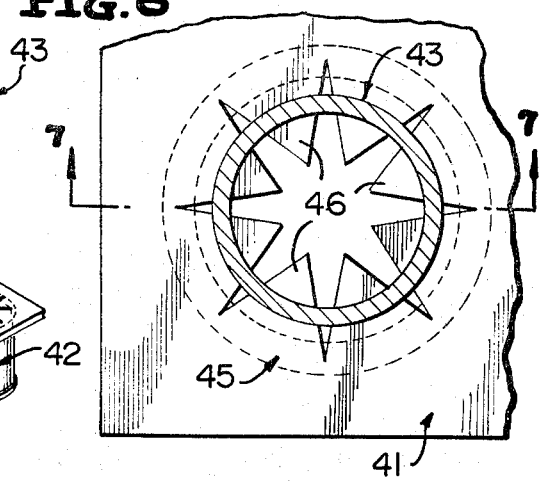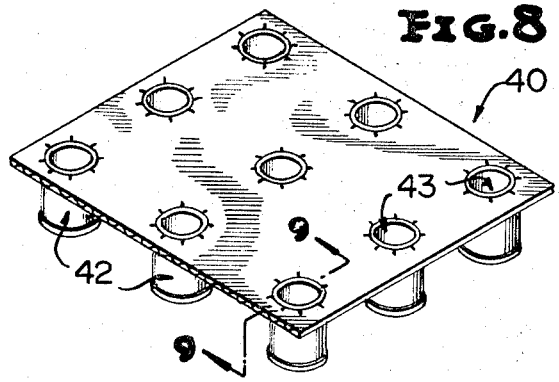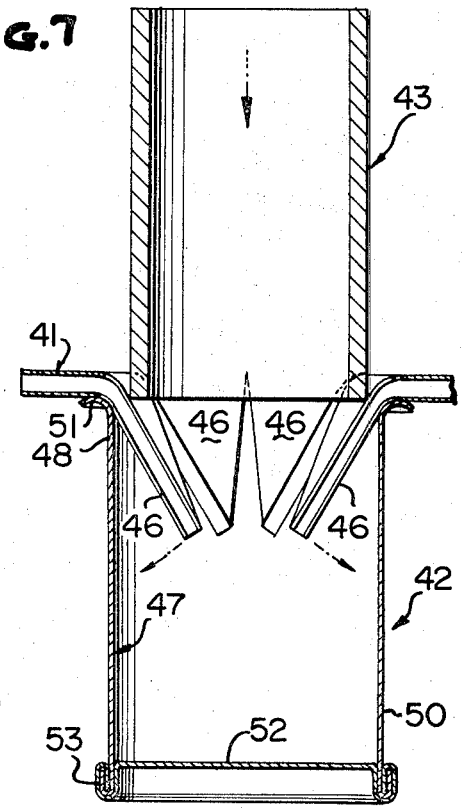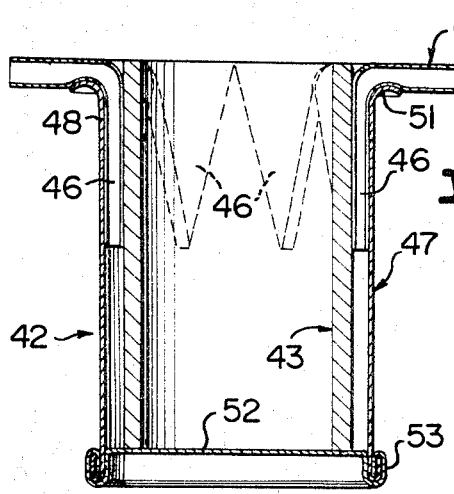

United States Patent Office 3,407,758
Patented Oct. 29, 1968

3,407,758
EXPENDABLE PALLETS
Daniel Simkins, Chicago, Ill., assignor to Continental Can Company, Inc., New York, N.Y., a corporation of New York
Filed May 20, 1966, Ser. No. 551,570
11 Claims. (Cl. 108—51)

ABSTRACT OF THE DISCLOSURE

This invention is directed to an expendable pallet which is formed of upper and lower pairs of corrugated board members between which are secured a plurality of tubular metallic elements, such as cans or can bodies. The most adjacent ones of the corrugated boards are provided with axially aligned recesses which receive and grippingly engage circumferentially reinforced end portions of the metallic elements. Due to the nature of the corrugated board and the metallic elements the corrugated board is deformed to clampingly engage and retain the components of the pallets in assembled condition in the absence of adhesive or similar conventional securing means.

Conventional pallets of the expendable type are relatively well known, but in most cases such pallets are relatively expensive to manufacture, and though designed for but a single usage, often fail because the material from which the pallets are constructed is not structurally sound or suitably reinforced. Such pallets are generally manufactured from waste material which might otherwise be destroyed and therefore offer some savings from the standpoint of the cost of material from which the pallets are constructed. As is readily apparent, if the material from which the pallets are constructed is not appropriate for being formed into pallets for a variety of reasons, such as the inability to take high compressive loads, the pallets will necessarily fail when subjected to average shipping and storage abuses.

It is, therefore, a primary object of this invention to provide novel expendable pallets which are constructed to overcome the above and numerous other disadvantages in conventional expendable pallets, and are particularly inexpensive to manufacture and are highly resistant to collapse under compressive and/or radial loads, each of said pallets being formed from a generally planar corrugated board member and a plurality of tubular metallic can bodies, the can bodies having axially opposite circumferentially seamed end portions which are clampingly received in recesses of the corrugated board in the absence of adhesive or similar securing means.

A further object of this invention is to provide a novel pallet of the type heretofore described in which the can bodies are provided with internal reinforcing means for preventing the collapse thereof under radially or axially applied forces.

Still another object of this invention is to provide a novel pallet embodying each of the components heretofore described, and further including circumferential reinforcing means which perform the combined functions of circumferentially reinforcing the can bodies and closing the opposite end portions thereof.

Still another object of this invention is to provide a novel pallet of the type heretofore described wherein the first end portions of the can bodies are open, and portions of the paperstock member are received in each can body in sandwiched relationship between the can body and an associated reinforcing element housed therein.

A further object of this invention is to provide a pallet including a pair of planar paperstock members disposed in generally parallel relationship, a plurality of recess means in the planar members, the recess means being in opposed axial alignment, a plurality of metallic can bodies having axially opposite end portions, the first end portion of the can bodies being securably received in the recess means of a first of the paperstock members, and a second opposite end portion of each of the can bodies being securably received in the recess means of the second of the paperstock members.

A further object of this invention is to provide a novel pallet of the type immediately above-described wherein the end portions of the can bodies are closed by end closures, and the end closures are secured to the can bodies by associated circumferential seams which additionally function to circumferentially reinforce the can bodies against both axially and radially imposed forces.

With the above, and other objects in view that will hereinafter appear, the nature of the invention will be more clearly understood by reference to the following detailed description, the appended claims and the several views illustrated in the accompanying drawings:

In the drawings:

FIGURE 5 is a perspective view of another plurality of components from which is constructed another pallet in accordance with this invention, and illustrates the manner in which can bodies and tubular reinforcing elements are united with a paperstock planar member to form the pallet.

FIGURE 6 is a highly enlarged fragmentary sectional view taken generally along line 6—6 of FIGURE 5, and illustrates the position of one of the tubular elements prior to being inserted downwardly into an associated can body.

FIGURE 7 is a fragmentary sectional view taken generally along line 7—7 of FIGURE 6, and more clearly illustrates the manner in which the tubular element is inserted into the can body and portions of the paperstock member which are deflected inwardly thereof.

FIGURE 8 is a top perspective view of the completely assembled pallet, and illustrates the can bodies secured to the pallet and reinforced internally of the tubular elements.

FIGURE 9 is a highly enlarged fragmentary sectional view taken generally along line 9—9 of FIGURE 8, and clearly illustrates the portions of the paperstock member sandwiched between one of the can bodies and its associated reinforcing element.

Figure 1:
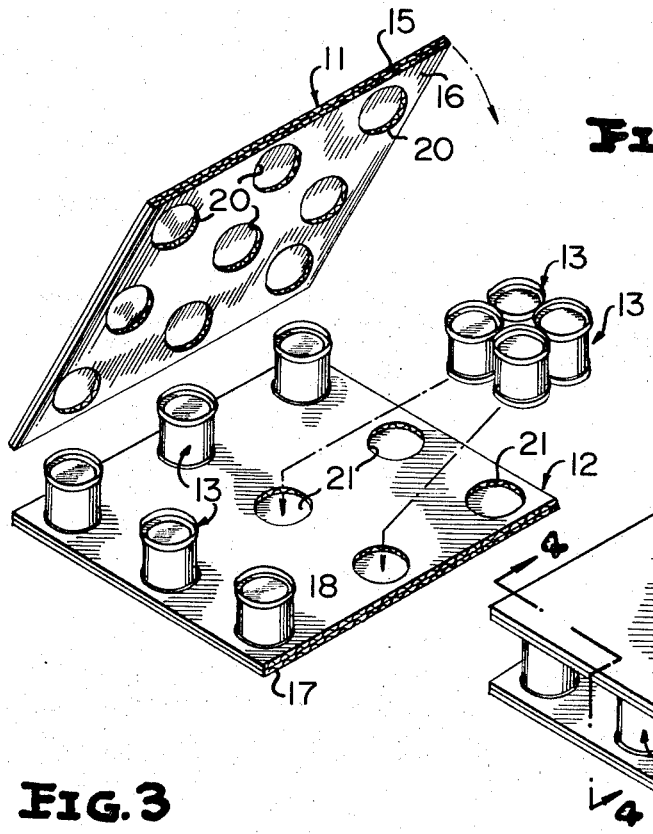
FIGURE 1 is a perspective view of a plurality of components from which is constructed a pallet of this invention and illustrates a plurality of can bodies being seated in recesses of a pair of planar paperstock members.
Figure 2:
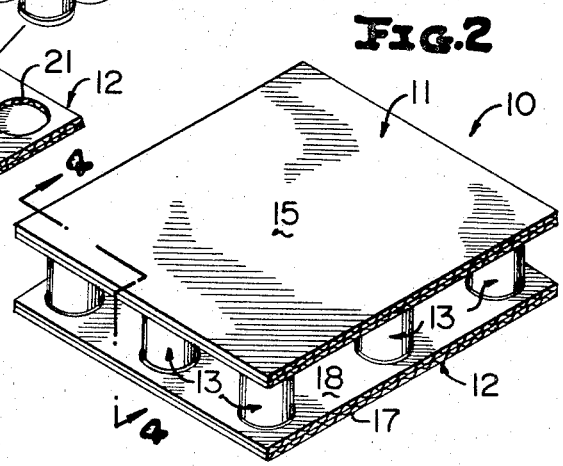
FIGURE 2 is a top perspective view of the finally assembled pallet of FIGURE 1, and illustrates the planar members disposed in generally parallel relationship by means of the can bodies.
Figure 3:
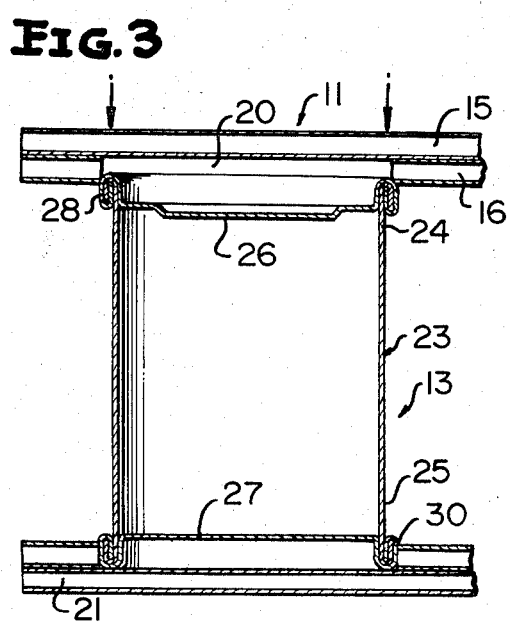
FIGURE 3 is an enlarged fragmentary sectional view taken generally along line 3—3 of FIGURE 2 prior to the completed assembly of the paperstock members and the can bodies, and illustrates the forceful application of the paperstock members to the can bodies resulting in frictional engagement therebetween.
Figure 4:
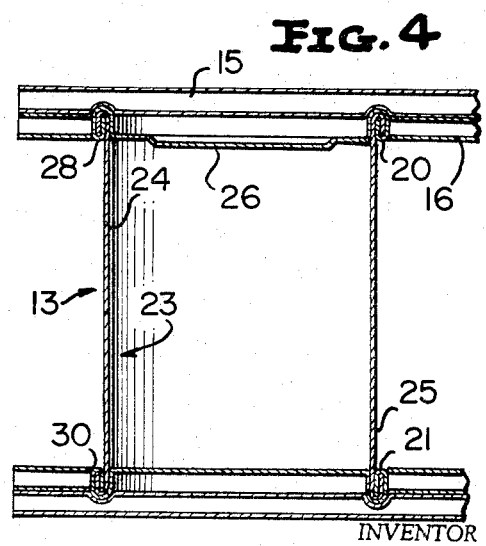
FIGURE 4 is an enlarged fragmentary sectional view taken generally along line 4—4 of FIGURE 2, and illustrates the final assembled position of one of the can bodies and the paperstock members.

Referring first to FIGURES 1 through 4 of the drawings, a novel expendable pallet constructed in accordance with this invention is fully illustrated in FIGURE 2 and is generally designated by the reference numeral 10. The pallet 10 is constructed from two generally rectangular planar members 11, 12 and a plurality of tubular metallic elements 13.

The planar members 11, 12 are preferably constructed from double-wall corrugated board including respective walls 15, 16 and 17, 18. The paperstock members 11, 12 are preferably of a rectangular or square configuration, but the particular configuration thereof may be varied in accordance with the articles which are to be supported by the pallet 10.

The wall 16 of the paperstock member 11 is provided with a plurality of circular cutouts 20 defining recess means which are axially aligned with similar circular recess means 21 formed by cutting circular holes in the wall 18 of the paperstock member 12.

The metallic elements 13 are preferably cans which include minor defects, such as imperfect side seams, imperfect double seams or similar defects which render the cans 13 unsuitable for the packaging of edible products but in no way appreciably weaken the strength thereof. Each of the cans 13 includes a can body 23 of a generally tubular cylindrical configuration having opposite axial end portions 24, 25. The opposite end portions 24, 25 of the can body 23 is closed by respective closures 26, 27. The closures 26, 27 are similarly constructed from metallic material and are preferably double-seamed by seams 28, 30 to the can body 23 of each of the cans 13 by suitable conventional double-seaming means. Due to the multi-layer construction of the double seams 28, 30 the seams function not only to unite each of the can bodies with the associated closures but also function to circumferentially reinforce the axially opposite end portions of each of the cans.

The pallet 10 is preferably constructed by first seating the seam 30 of each can 13 into an associated one of the recesses 21 of the paperstock member 12. The recesses 21 are preferably slightly smaller in diameter than the maximum exterior dimension of the seams 30 which results in a frictional securement between each seam 30 and the wall 18.

The paperstock member 11 is thereafter positioned in overlying relationship to the cans 13 and the recesses 21. Forces applied to the paperstock member 11, as indicated by the unnumbered headed arrows in FIGURE 3 of the drawings, urge the seams 28 of each of the cams 13 into an associated one of the recesses 20 of the member 11. The exterior diameter of the seams 28 is also preferably slightly greater than the diameter of the recesses 20 whereby frictional purchase maintains these elements in assembled relationship. The forceful application of the paperstock member 11 to the cans 13 may be accomplished by, for example, placing the pallet between the bed and ram of a press (not shown) and applying sufficient force to fully seat the seams in the recesses, in the manner best illustrated in FIGURE 4 of the drawings. In the fully seated position of the cans 13 the seams thereof are substantially entirely received in the recesses 20, 21 and are in excellent frictional engagement therewith. If necessary or desirable adhesive means (not shown) may be applied in the recesses 20, 21 prior to inserting the seams 30, 28 therein to augment the frictional forces maintaining the paperstock members 11, 12 and the cans 13 in assembled relationship.

Another novel pallet constructed in accordance with this invention is fully illustrated in FIGURE 8 of the drawings, and is generally designated by the reference numeral 40. The pallet 40 is formed of a planar generally rectangular paperstock member 41, a plurality of tubular metallic elements 42 and a plurality of tubular reinforcing elements 43.

The paperstock member 41 is preferably constructed from single wall corrugated board which is cross-cut at a plurality of selected areas 45 to define a plurality of triangular tabs 46 (FIGURE 6) having apices merging at a common point.

The metallic elements 42 are identical, and each is preferably a can which includes a can body 47 (FIGURE 7) having axially opposite end portions 48, 50. An upper-most one of the end portions 48 is open and includes a conventional radially outwardly directed peripheral flange 51 to which is normally double-seamed a conventional end closure. However, each of the cans 42 preferably includes minor defects which render the same unacceptable for performing their usual function of receiving packaged products. The cans 42 may, for example, have defective flanges 51 which may be cracked or otherwise mutilated to which an end closure could not be secured in an acceptable manner. The end portion 50 of each of the cans 42 preferably includes an end closure 52 constructed of metallic material which is conventionally secured to the can body 47 by a reinforcing double-seam 53. While the cans 42 are preferably so-called "rejects" it is to be understood that the cans 42, as well as the cans 13, can be perfectly sound and need not possess any type of defects whatever.

The tubular reinforcing elements 43 are preferably salvaged paperstock cores about which are normally wound roll stock or web material. Once the web material is depleated such cores are normally considered scrap material and are generally merely destroyed. However, in accordance with this invention such cores are cut to desired lengths for insertion into the cans 42, as will be apparent more fully immediately hereafter. However, the reinforcing elements 43 need not be constructed from scrap material but can, of course, be constructed as desired from paperstock or similar material and can, if desired, be completely solid.

The pallet 40 is assembled by positioning the cans 42 in underlying relationship to each of the areas 45 after which a reinforcing element 43 is inserted into each can 42 in the manner diagrammatically illustrated in FIGURE 7 of the drawings. During the insertion of the reinforcing elements into the cans 42, the tabs 43 are deflected downwardly and are eventually sandwiched between and frictionally gripped by each can body 47 and its associated reinforcing element 43. If desired, adhesive may be suitably employed to augment the frictional securement of the elements 41, 42 and 43, but by proper dimensioning adhesive is unnecessary for the successful operation of the pallet 40 under normal conditions of storage and shipment.

A primary advantage of each of the pallets 10, 40 is the high resistance thereof to both axial and radial forces. The cans 13, 42 are highly resistant to compressive loads to which the pallets 10, 40 are subjected by the articles (not shown) supported thereby while the seams 28, 30, 53 and the reinforcing elements 43 prevent the can bodies from collapsing radially inwardly if, for example, they are accidentally struck by the tines of a lift truck. A major advantage of the pallet 10 as compared to the pallet 40 is the use of only a single paperstock supporting member which reduces the manufacturing cost of the pallet 40. In addition, since the cans 42 are constructed of metal they are impervious to the destructive forces of water, chemicals, oils, solvents and similar materials which could adversely effect the lower paperstock member 12 of the pallet 10. However, it is to be understood that the paperstock members 11, 12 and 41 can be suitably coated with moisture and chemical resistant materials.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. A pallet comprising a pair of upper and lower planar members disposed in generally parallel relationship, said upper and lower planar members having respective generally unbroken and continuous upper and lower surfaces, a plurality of recess means in said planar members, said recess means being directed toward and opening in opposed axial alignment to each other, a plurality of tubular elements having axially opposite end portions, a first end portion of said elements being securably received in the recess means of the upper planar member, and a second opposite end portion of said elements being securably received in the recess means of the lower planar member.

2. The pallet as defined in claim 1 wherein said planar members are constructed from paperstock material, and said tubular elements are constructed from metallic material.

3. The pallet as defined in claim 1 wherein said tubular elements include means for circumferentially reinforcing the same.

4. The pallet as defined in claim 1 wherein said tubular elements each include means closing at least one end portion thereof.

5. The pallet as defined in claim 1 wherein said tubular elements each include closures at axially opposite end portions thereof, and at least one of the closures of each tubular element is secured thereto by circumferential seam means.

6. The pallet as defined in claim 1 wherein said planar members are constructed from corrugated board and said tubular elements are metallic can bodies.

7. The pallet as defined in claim 1 wherein said upper and lower planar members are each defined by a pair of corrugated boards, and said recess means are formed in the most adjacent ones of said corrugated boards.

8. The pallet as defined in claim 1 wherein said upper and lower planar members are each defined by a pair of sheet material members, and said recess means are formed in the most adjacent ones of said sheet material members.

9. The pallet as defined in claim 7 wherein the most adjacent ones of said corrugated boards are each defined by inner and outer sheet material plies and an intermediate corrugated sheet material ply, said first and second end portions of said elements having end closures secured thereto by circumferential seams, and said seams being in frictional clamping engagement with the material of said adjacent corrugated boards within the recess means thereof.

10. The pallet as defined in claim 8 wherein said first and second end portions of said elements are provided with circumferential reinforcing means in the form of multiple plies of material, said reinforcing means being clampingly received in said recess means, and the clamping engagement between said reinforcing means and said recess means being the sole means for maintaining said components in assembled relationship.

11. A pallet comprising a generally planar member of corrugated board defined by inner and outer planar sheets and a corrugated sheet therebetween, a plurality of tubular elements having axially opposite end portions, means securing a first end portion of each of said tubular elements to said planar member, reinforcing means internally of at least selected ones of said tubular elements for preventing the collapse thereof under radially or axially applied forces, the first end portion of each tubular element being open, a portion of the planar member being housed in at least selected ones of said open end portions, the housed portions of the planar member being sandwiched between an associated tubular element and its reinforcing means, means for closing an opposite end portion of at least selected ones of said tubular elements, said at least selected ones of said elements being circumferentially reinforced by circumferential reinforcing means, said circumferential reinforcing means being further operative to secure a closure to an associated one of said selected tubular elements, said first end portion terminating in a radially upwardly, outwardly and downwardly directed circumferential flange, and said flange being clampingly received in an annular groove defined by a deformed portion of said corrugated board thereby augmenting the frictional purchase between said tubular elements and said corrugated board.

References Cited
UNITED STATES PATENTS

| | | | |
|---|---|---|---|
| 2,507,588 | 5/1950 | Brandon et al. | 108—57 |
| 2,706,099 | 4/1955 | Whalley | 108—53 |
| 2,888,221 | 5/1959 | Connelly | 108—56 |
| 2,930,560 | 3/1960 | Carnwath et al. | 108—56 |
| 2,953,339 | 10/1960 | Roshon | 108—56 |
| 3,123,020 | 3/1964 | Voissem | 108—51 |

FOREIGN PATENTS

| | | |
|---|---|---|
| 659,840 | 3/1963 | Canada. |
| 1,301,363 | 7/1962 | France. |
| 926,491 | 5/1963 | Great Britain. |

BOBBY R. GAY, *Primary Examiner.*

G. O. FINCH, *Assistant Examiner.*